(12) United States Patent
Masser et al.

(10) Patent No.: US 9,921,930 B2
(45) Date of Patent: Mar. 20, 2018

(54) USING VALUES OF MULTIPLE METADATA PARAMETERS FOR A TARGET DATA RECORD SET POPULATION TO GENERATE A CORRESPONDING TEST DATA RECORD SET POPULATION

(71) Applicant: International Business Machines Corporation, Armonk, NY (US)

(72) Inventors: Joel L. Masser, San Jose, CA (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 14/637,575

(22) Filed: Mar. 4, 2015

(65) Prior Publication Data
US 2016/0259701 A1    Sep. 8, 2016

(51) Int. Cl.
| | | |
|---|---|---|
| *G06F 11/36* | (2006.01) | |
| *G06F 11/263* | (2006.01) | |
| *G06F 11/30* | (2006.01) | |
| *G06F 11/34* | (2006.01) | |

(52) U.S. Cl.
CPC ...... *G06F 11/2635* (2013.01); *G06F 11/3034* (2013.01); *G06F 11/36* (2013.01); *G06F 11/3668* (2013.01); *G06F 11/3414* (2013.01); *G06F 11/3664* (2013.01)

(58) Field of Classification Search
CPC .. G06F 11/3452; G06F 11/34; G06F 11/3404; G06F 11/3684; G06F 11/3688; G06F 11/3414; G06F 11/3664; G06F 11/36
See application file for complete search history.

(56) References Cited

U.S. PATENT DOCUMENTS

| | | | |
|---|---|---|---|
| 8,019,049 B2 | 9/2011 | Allen, Jr. et al. | |
| 9,189,309 B1* | 11/2015 | Ma | G06F 11/3034 |
| 2002/0161700 A1 | 10/2002 | Ernst et al. | |
| 2005/0278703 A1* | 12/2005 | Lo | G06F 11/0709 717/126 |
| 2009/0105863 A1* | 4/2009 | Bagwell | G06Q 10/06 700/110 |
| 2010/0287534 A1* | 11/2010 | Vangala | G06F 11/3612 717/124 |
| 2013/0191107 A1* | 7/2013 | Tonouchi | G06F 11/3409 703/21 |
| 2013/0211762 A1* | 8/2013 | Taskov | G06F 11/366 702/88 |

* cited by examiner

*Primary Examiner* — Joseph Schell
(74) *Attorney, Agent, or Firm* — Nolan M. Lawrence (57) ABSTRACT

Metadata of a target data record set population is used to generate a test data record set population for use in data storage system testing. The metadata includes values for metadata parameters for individual target data record sets. The target data record set population as a whole has metadata parameter values distributed among sets of value ranges. A group of proportions is calculated for each set of value ranges. A test data record set population is generated based on the groups of proportions. As generated, the test data record set population meets a set of predetermined criteria.

3 Claims, 6 Drawing Sheets

USING VALUES OF MULTIPLE METADATA PARAMETERS FOR A TARGET DATA RECORD SET POPULATION TO GENERATE A CORRESPONDING TEST DATA RECORD SET POPULATION

BACKGROUND

The present disclosure relates to data storage management and, more specifically, to generating test data record sets for use in data storage system testing.

In an age when a single commercial entity may need to continuously maintain and to daily process millions of data records, it is important that data storage systems be reliable. The ability to perform high-quality testing may be a significant factor in achieving this goal of reliability. Whether performed during data storage system production (e.g., as a quality control measure) or in a post-production environment after a defect or anomaly is detected, the significance of such testing should not be underestimated.

SUMMARY

According to embodiments of the present disclosure, aspects of the disclosure may include a method, a system, and a computer program product for using target metadata of a target data record set population to generate a test data record set population. In some embodiments, target metadata is analyzed. As analyzed, the target metadata contains, for each individual target data record set of the target data record set population, a value for a first metadata parameter and a value for a second metadata parameter. The target data record set population as a whole has, distributed among a first plurality of value ranges, a first set of values for the first metadata parameter. The target data record set population as a whole also has, distributed among a second plurality of value ranges, a second set of values for the second metadata parameter.

Based on the analysis of the target metadata, first and second groups of proportions for the target data record set population are calculated. As calculated, the first group of proportions has, for each value range of the first plurality of value ranges, a proportion of the first set of values within that particular value range. Further, as calculated, the second group of proportions has, for each value range of the second plurality of value ranges, a proportion of the second set of values within that particular value range.

Based on at least the first and second groups of proportions, the test data record set population is generated. As generated, the test data record set population meets a set of predetermined criteria. Further, as generated, each individual test data record set of the test data record set population has a value for a first metadata parameter and a value for a second metadata parameter. The test data record set population as a whole has, distributed among the first plurality of value ranges, a third set of values for the first metadata parameter. The test data record set population as a whole also has, distributed among the second plurality of value ranges, a fourth set of values for the second metadata parameter.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data storage management and, more specifically, to generating test data record sets for use in data storage system testing. While the present disclosure is not necessarily limited to such applications, various aspects of the disclosure may be appreciated through a discussion of various examples using this context.

As used herein, in some embodiments, a data record set (e.g., data set) may refer to a group of any number of individual data records that are grouped together and organized and accessed according to the standards of the data record set. For example, a particular company's (e.g., consumer's) payroll application might have a payroll data record for each employee of the company. Each particular employee payroll data record might include predetermined categories of information about a particular employee (e.g., social security number, wage rate, tax information, etc.). These individual employee payroll data records may together make up a payroll data record set for the application. Furthermore, in some embodiments, a particular consumer may have any number of data record sets that together form a data record set population for that particular consumer. Within the population, each data record set may have its own characteristics and its own type of data records that it contains.

Testing a data storage system (either specific system functionalities or the entire system) may require running one or more tests on a data record set population made up of individual data record sets. In some instances, actual data record sets that are stored on the data storage system, or which the data system is configured to store, may be included in the data record set population used for testing. In other situations, the use of actual data record sets for testing may be impractical or impossible. This may occur for a variety of reasons. For example, consumers that store confidential data records (e.g., banks or law firms) may be reluctant to turn over their data record sets to a third party repair service for use in system testing. Furthermore, as another example, using actual data record sets may require combining data records from more than one consumer in order to have a data record set population that is representative of the varied types of data records that different consumers could store on a particular system. This combining of data records could be time-consuming or impossible because of inconsistencies between data record sets from different consumers.

As a result of these difficulties, it may often be better to perform system testing on a test data record set population incorporating test data record sets (rather than actual data record sets). This solution, however, may pose its own challenges. For example, if a test data record set population includes a group of test data record sets that, as a whole, do not have similar characteristics as an actual data record set population, then the testing may be ineffective. This may be due, at least in part, to the fact that an individual data record set has values for a variety of different metadata parameters that may affect the extent to which a particular data storage system may be able to process the data record set. These data record set metadata parameters may include a wide array of characteristics including, for example, data record type (fixed length vs. variable length), whether data records of the data record set reside on extended addressable volumes, block size, index status (indexed vs. non-indexed), virtual storage access method (VSAM) status (VSAM data record set vs. non-VSAM data record set), and number of data records. In some embodiments, the data record set metadata parameters may be defined to greater degrees of granularity. For example, for VSAM data record sets, a metadata parameter may include the subtype of each VSAM data record set (e.g., key sequence data set, entry sequence data set, linear data set, or relative record data set). For another example, for non-VSAM data record sets, a metadata parameter may include the subtype of each non-VSAM data record set (e.g., physical sequential, partitioned data set, or partitioned data set extended). The number of possible combinations of values for these metadata parameters for a single data record set may be high; for an entire data record set population containing many individual data record sets, the number of combinations may be astronomical.

Given these realities, it may be important to generate test data record sets that, when grouped together, effectively represent or mirror the characteristics of a group of actual data record sets of interest.

In some embodiments of the present disclosure, metadata about a target population of actual data record sets stored on a data storage system is obtained and analyzed. Using the metadata, groups of proportions for value ranges of metadata parameters within the target data record set population are calculated. These groups of proportions are then used to generate test data record set populations that meet a set of predetermined criteria and are adapted to be used in performing tests of system functionalities of the data storage system.

In some embodiments, there may be significant insight related to generating test data record set populations that can be gained by collecting metadata related to the characteristics of actual data record sets used in a particular consumer's computing environment. This metadata may be collected explicitly through requesting certain types of listings from utilities configured to work within the consumer's data storage system. This metadata may also be collected by analyzing documentation submitted by the consumer for other primary purposes. For example, metadata may collected from information deposited during a dump formatting of control blocks of the data storage system under test.

Once this metadata is collected, it may be reduced, filtered, and then analyzed to identify optimal or advantageous values of metadata parameters that test data record set populations should have.

Figure 1:
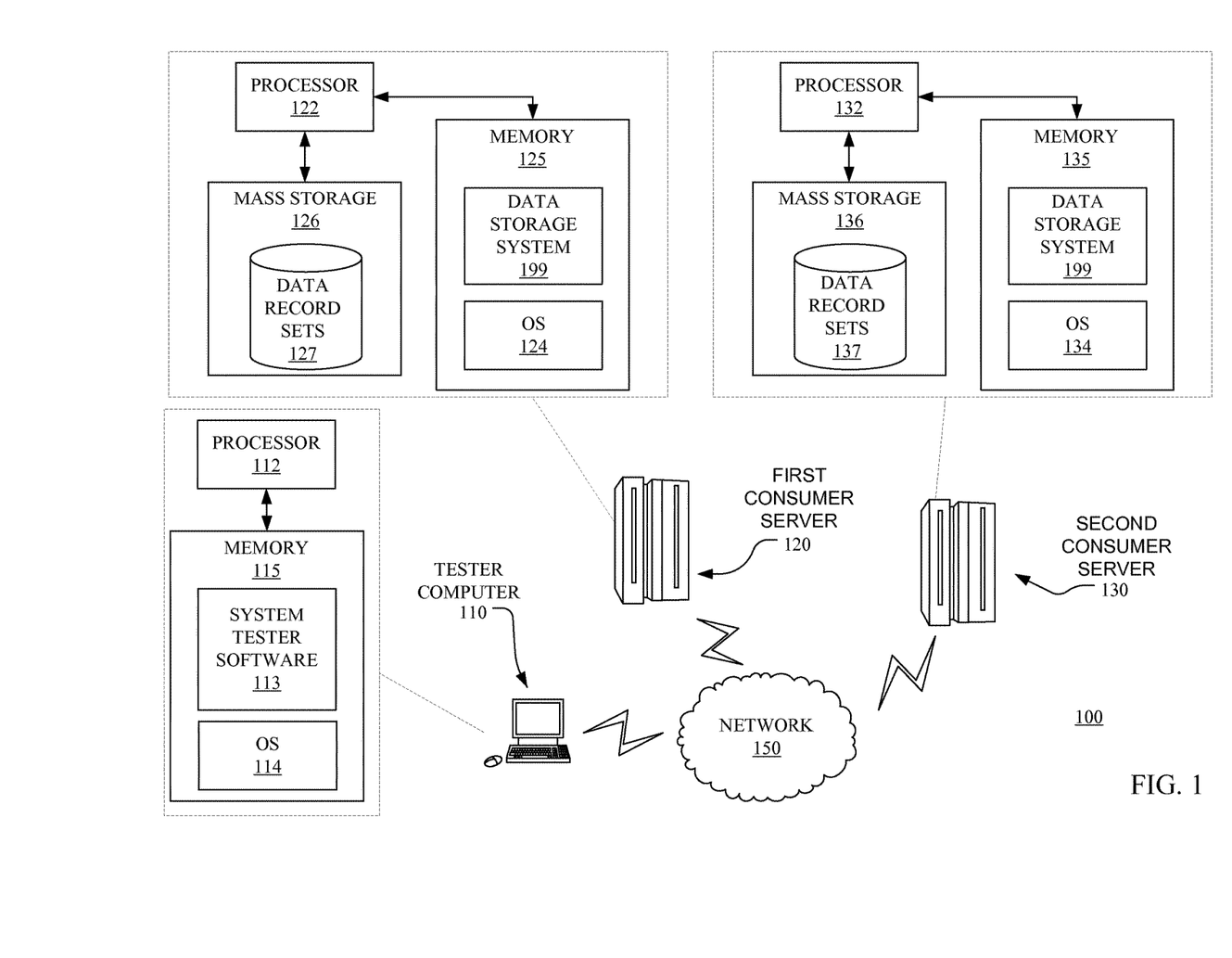
FIG. 1 illustrates a block diagram of an example distributed computing environment configured for testing a data storage system, in accordance with embodiments of the present disclosure.

Referring now to FIG. 1, shown is a block diagram of an example distributed computing environment 100 configured for testing a data storage system 199, in accordance with embodiments of the present disclosure. As shown, distributed computing environment 100 includes three computers (specifically, tester computer 110, first consumer server 120, and second consumer server 130) in communication with one another over a network 150. In some embodiments, the network 150 may be implemented by any number of any suitable communications media (e.g., wide area network (WAN), local area network (LAN), Internet, intranet, etc.). Alternatively, the computers of network 150 may be local to one another, and communicate via any appropriate local communication medium (e.g., local area network (LAN), hardwire, wireless link, intranet, etc.). In some embodiments, the network 150 may be implemented within a cloud computing environment, or using one or more cloud computing services. As described herein, a cloud computing environment may include a network-based, distributed data processing system that provides one or more cloud computing services.

As shown, the hardware and software elements of the servers 120, 130 include processors 122, 132 in communication with mass storages 126, 136 and memory 125, 135. Each represented processor 122, 133 may include one or more processors and memory 125, 135 may incorporate any type of memory including, for example, random access memory. Each memory 125, 135 includes an operating system (OS) 124, 134 and a copy of database storage system 199. Each mass storage 126, 136 may include one or more hard disk drives on which it houses data record sets 127, 137. In use, each of the first consumer and second consumer may use its own copy of data storage system 199 to manage and process its own data record sets 127, 137 stored on its respective server 120, 130.

Also included in the computing environment 100 is a tester computer 110. As depicted, tester computer 110 includes a processor 112 in communication with memory 115, which includes an OS 114 and system tester software 113. In use, the system tester software 113 may be used to test one or more functionalities (or proposed new functionalities) of data storage system 199. To facilitate this testing, tester computer 110 may communicate with consumer servers 120, 130 in order to obtain information about their copies of data storage system 199 and their data record sets 127, 137.

While distributed computing environment 100 is depicted as including a tester computer 110 and servers 120, 130, it is contemplated that, in some embodiments, these computers may be any relevant computer systems or combination of computer systems including, for example, servers, desktops, laptops, mobile phones, smart phones, tablets, personal or enterprise digital assistants, and the like. Further, the three computers of FIG. 1 are shown for illustrative purposes only; it is contemplated that any number of computers may be used in some embodiments.

Also, while data storage system 199 is depicted as a software module, it is contemplated that, in some embodiments, data storage system 199 may encompass any combination of computer hardware or software modules configured to process or manage data record sets. Such data storage systems may include, without limitation, any applicable combinations of database management systems (DBMS), file systems, direct access storage devices (DASD), and network attached storage (NAS). Further, in some embodiments, more than one consumer may share a single data storage system 199 to store their data record sets (which may include the data record sets of their respective clients and customers).

Figure 2A:
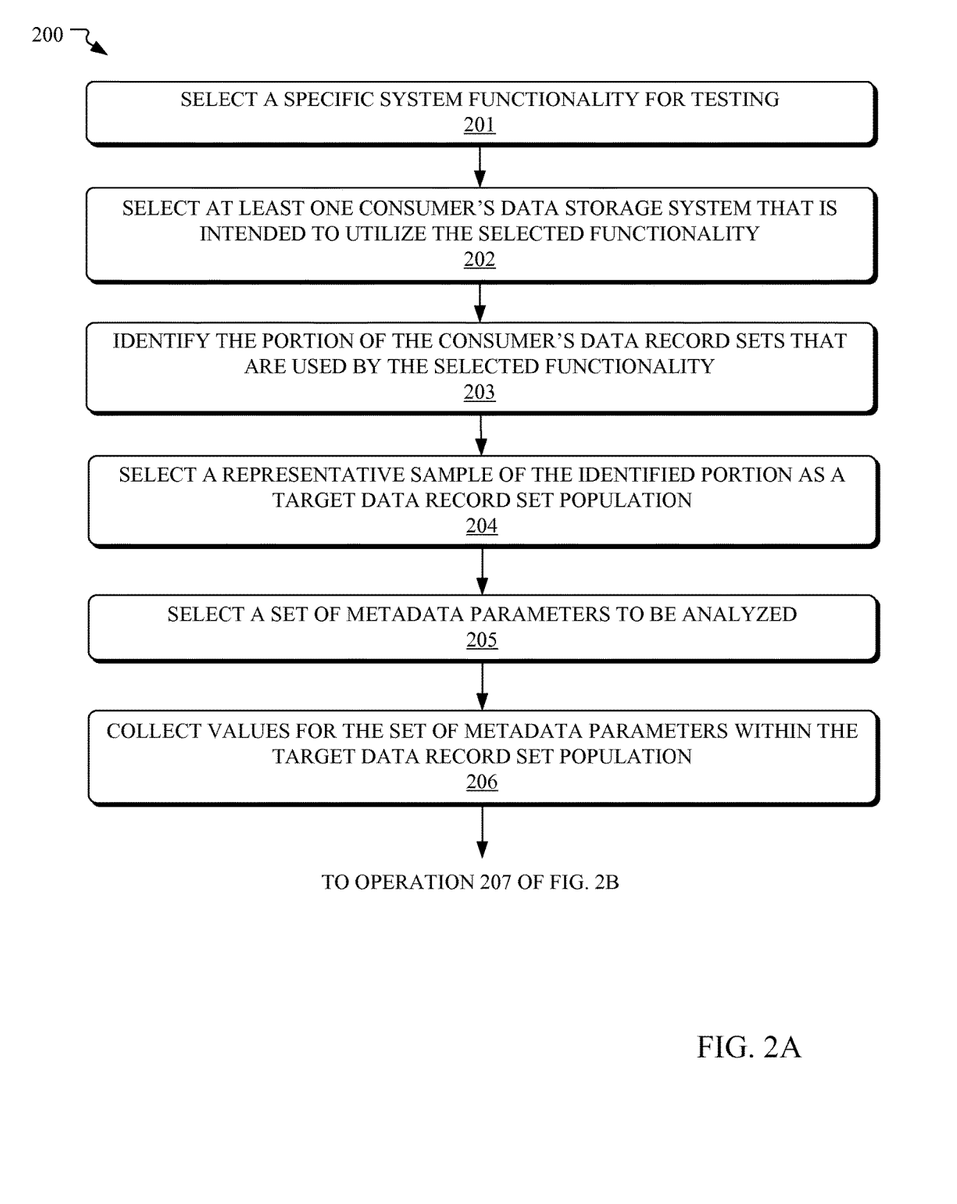
FIGS. 2A, 2B, and 2C (collectively "FIG. 2") illustrate separate portions of a flowchart of an example method for generating a test data record set population for use in data storage system testing, in accordance with embodiments of the present disclosure.
Figure 2B:
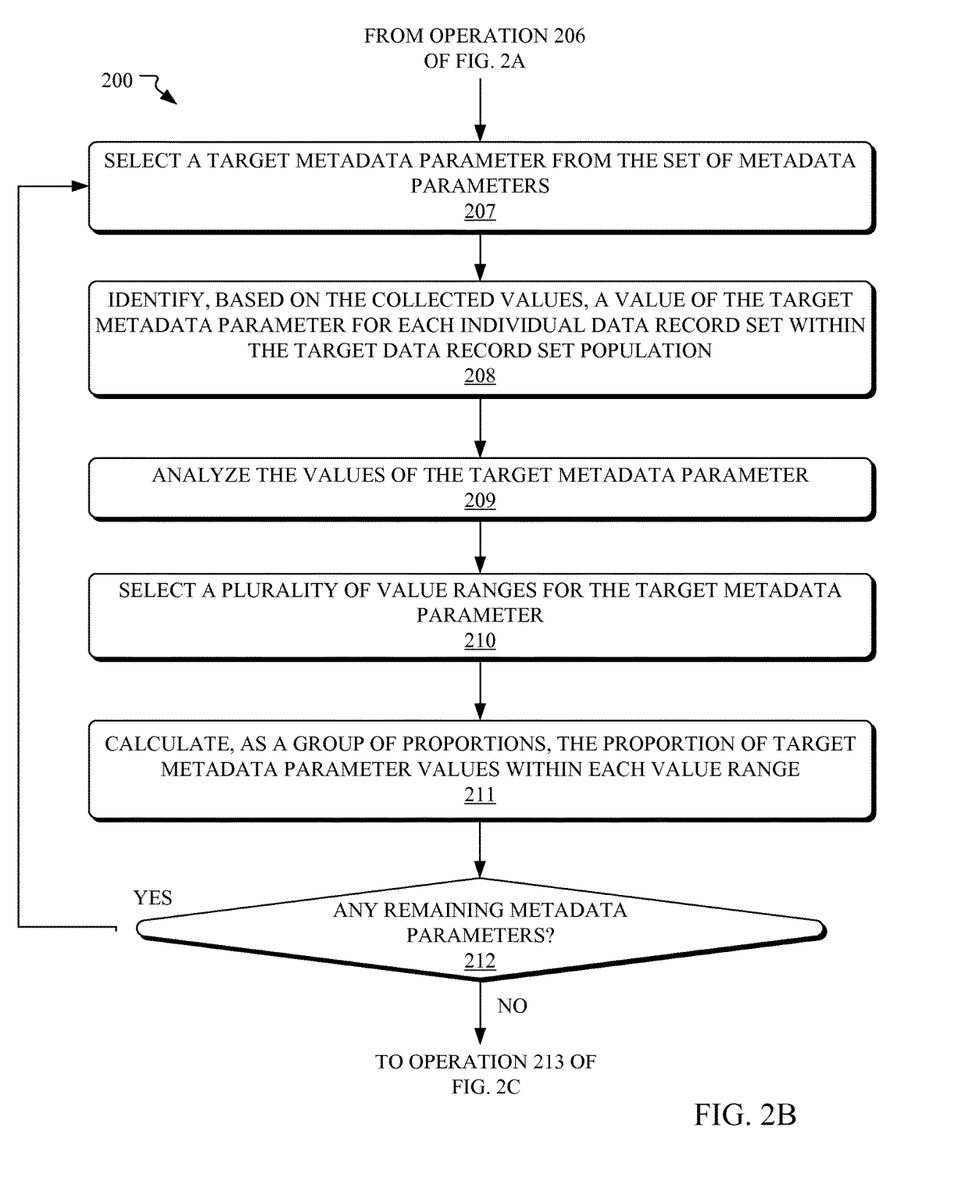
Figure 2C:
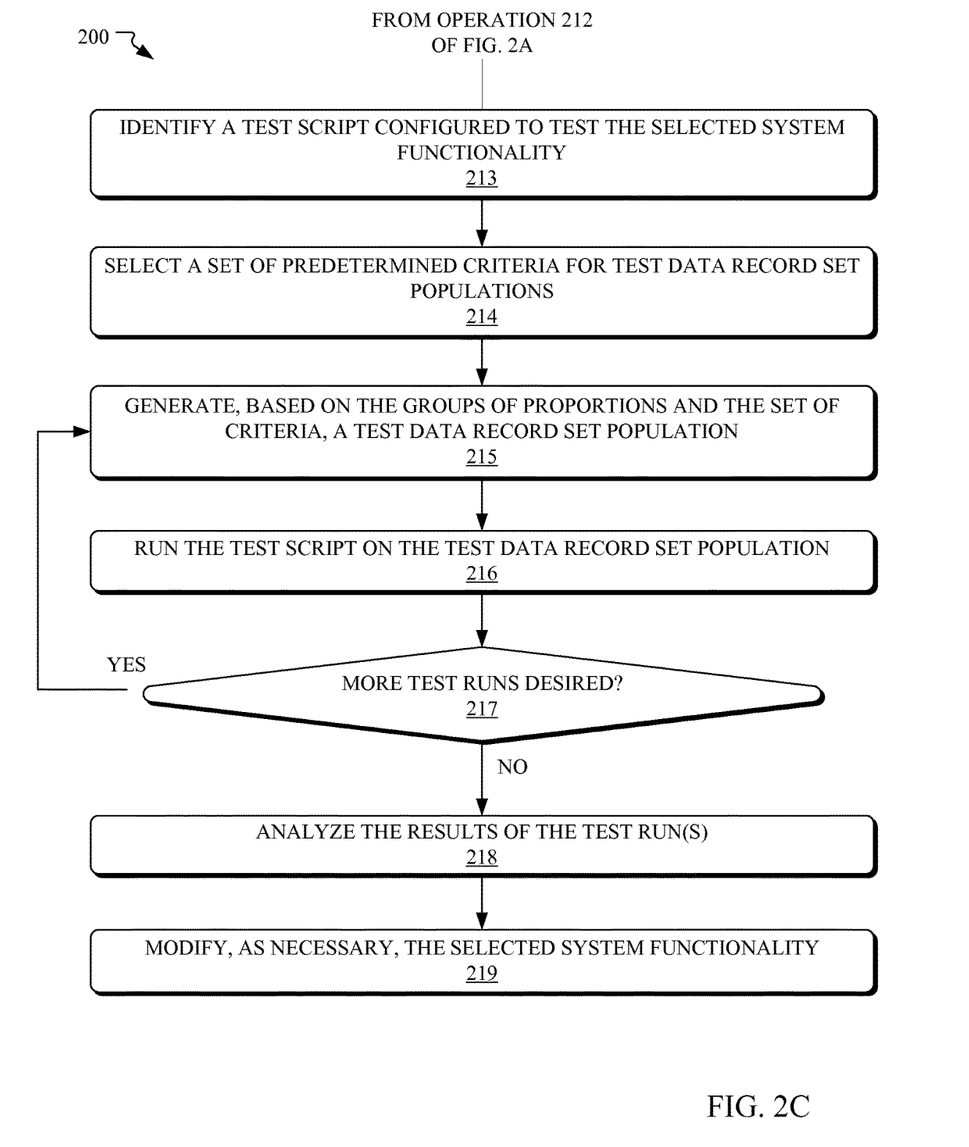

Referring now to FIGS. 2A, 2B, and 2C (collectively "FIG. 2"), shown is a flowchart of an example method 200 for generating a test data record set population for use in data storage system testing, in accordance with embodiments of the present disclosure. In some embodiments, one or more operations of the method 200 may be performed by one or more of the computer hardware and software elements shown in FIG. 1, including, in particular, system tester software 113. The method may begin at operation 201, wherein a specific system functionality is selected for testing. This selected functionality may be chosen, for example, because it has been problematic for consumers or because it has been newly implemented or modified. Any relevant functionality of a data storage system may be selected including, for example, a copy path function, backup and restore functionality, defragmentation functionality, or high update activity functionalities (to data record sets from a single user or to data record sets from many users).

Per operation 202, at least one consumer's data storage system that is intended to utilize the identified system functionality is selected. This particular consumer (or set of consumers) may be selected, for example, because it is the consumer having problems with the selected system functionality or because it is the largest or most significant user of the selected system functionality.

Per operation 203, the portion of the selected consumer's data record sets that are used by the selected functionality is identified. Whether or not a specific data record set is identified as used by the selected functionality may be determined in many different ways. In particular, in some embodiments, the identified portion of data record sets may only include those data record sets that were ever actually used by the selected functionality or that were actually used by the selected functionality within a set period of time (e.g., in the last two weeks). Further, in some embodiments, the identified portion may only include those data record sets that the selected functionality is configured to use. For example, if the selected functionality cannot use (or is not intended to use) data record sets that contain more than one-hundred thousand data records, then only data record sets that have one-hundred thousand data records or less may be included in the identified portion.

Per operation 204, a representative sample of the identified portion of the consumer's data record sets are selected as a target data record set population. In some embodiments, the target data record set population may be selected from the identified portion via a simple random sample or by using another sampling method. The target data record set population may constitute any desired percentage of the identified portion. In some embodiments, the representative sample may include the entire identified portion.

In some embodiments, operations 201-204 may, taken together or individually, aid a user in obtaining a target data record set population that is, as compared to the entirety of the consumer's data record sets, more manageable in size for testing purposes or more directed toward the scope of the functionality under test.

Per operation 205, a set of metadata parameters to be analyzed is selected. This selection may be made by a user based on a determination that some metadata parameters are more relevant than others for use in generating adequate test data record sets. In some embodiments, the set of metadata parameters may include two or more metadata parameters of interest to the user.

Per operation 206, a value is collected for each selected metadata parameter for each consumer data record set of the target data record set population. For example, if there were two metadata parameters of interest and one-hundred data record sets in a target data record set population, then two-hundred values might be collected. A wide variety of methods may be used for collecting the metadata about the data record sets. In some embodiments, one or more system utilities of the data storage system under test may be usable for obtaining metadata from a system catalog, data set labels, or other related structures. Such system utilities may include, for example, LISTCAT, IEHLIST, or DCOLLECT. Further, in some embodiments, a special purpose program may be used for metadata collection purposes. In some embodiments, particularly where data record security is a concern, this metadata collection may be undertaken in such a manner that the entity collecting the metadata (e.g., a tester software program operated by a software programmer) may be provided access only to metadata about the consumer data records without being provided access to the content of any of the data record sets.

Once collected, the metadata may need to be filtered or otherwise reduced so that only the values for the relevant metadata parameters are kept and other, irrelevant metadata is discarded.

Per operation 207, a target metadata parameter is selected from the set of metadata parameters. Per operation 208, a value of the target metadata parameter is identified for each individual data record set within the target data record set population. These values of the target metadata parameter are analyzed, per operation 209. Per operation 210, a plurality of value ranges for the target metadata parameter are selected. For some target metadata parameters, there may be only two possible values and, therefore, the plurality of value ranges for that metadata parameter may include only two value ranges (e.g., VSAM and non-VSAM). Further, in some embodiments, the value ranges may be selected based on the analysis of the values of the target metadata parameter. For example, the value ranges might be selected such that the values are approximately equally distributed among the value ranges. Per operation 211, a group of proportions is calculated. As calculated, the group of proportions may include a proportion of target metadata parameter values within each value range. For example, if there are four value ranges for a target metadata parameter then the group of proportions for that metadata parameter could include proportions of one-quarter, three-sixteenths, one-half, and one-sixteenth.

In some embodiments, the group of proportions may be represented in any applicable form, including, for example, a cumulative frequency distribution or a table of percentages. Further, in some embodiments, one or more reports may be generated that show various statistics (e.g., means, minimums, or maximums) regarding values of the target metadata parameter within a target data record set population.

Per operation 212, a determination is made as to whether there are any remaining metadata parameters of the set of metadata parameters. For each remaining metadata parameter, operations 207-211 are completed, as applicable. Once there are no remaining metadata parameters, then, per operation 213, a test script configured to test the selected system functionality is identified. Per operation 214, a set of predetermined criteria (e.g., one or more criteria) is selected. The set of criteria may be used to limit the characteristics of test data record set populations to be generated. An example criterion might be that the test data record set population must have substantially the same groups of proportions as the target data record set population that it is designed to emulate. Further, in some embodiments, the predetermined criteria may be set or manipulated such that one or more known problematic value ranges are given special weighting. Per operation 215, a test data record set population is generated based on the groups of proportions and the set of predetermined criteria. In some embodiments, this generation of the test data record set population may include selecting individual test data record sets from a large pool of previously generated individual potential test data record sets. Furthermore, in some embodiments, each potential test data record set may include individual test data records that are themselves randomly generated.

Per operation 216, the selected test script is run on the test data record set population. In operation 217, a determination is made as to whether more test runs are desired. If so, then a new test data record set population may be generated, per operation 215, and the test script may be run on the new test data record set population, per operation 216. In some embodiments, test data record set populations may be sets of individual test data record sets that are created at test run time based on the selection of randomized values that are weighted based on the groups of proportions in relation to the set of predetermined criteria.

Once all of the desired test runs have been completed, then, per operation 218, the results of the test runs may be analyzed. In some embodiments, over many test runs the profile of the target data record set population may be effectively emulated and the testing results may be more realistic than results that would be otherwise obtained, for example, by generating test data record set populations without taking the groups of proportions into account. Based on the analysis and per operation 219, the selected system functionality may be modified (e.g., patched), as necessary.

Figure 3:
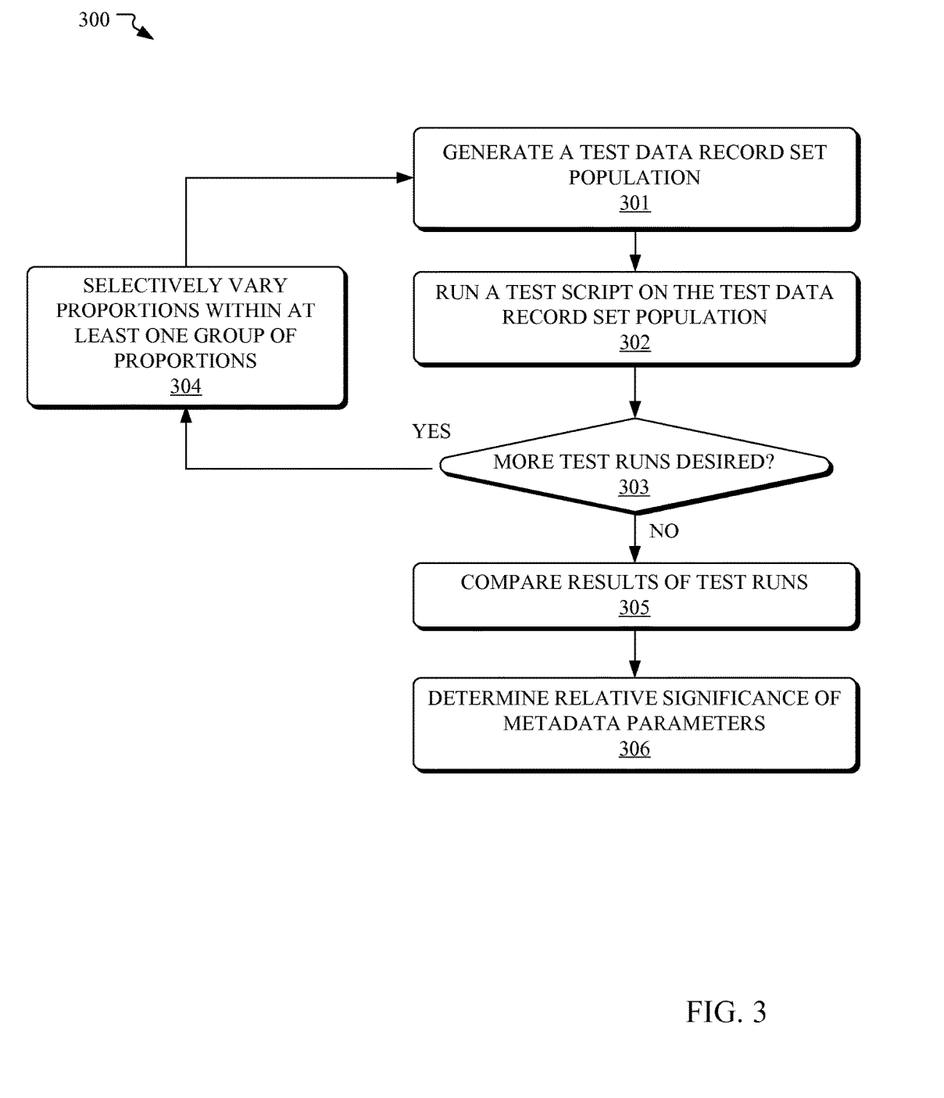
FIG. 3 illustrates a flowchart of an example method for determining the relative significance of at least one metadata parameter to a system functionality under test.

Referring now to FIG. 3, shown is a flowchart of an example method 300 for determining the relative significance of at least one metadata parameter to a system functionality under test. In some embodiments, test data record set populations may not have the same groups of proportions for values for metadata parameters as the target data populations from which the test data record set populations are derived. This may be done for the purposes of discovering which particular metadata parameter (or which values for a particular metadata parameter) is relatively more significant to the system functionality under test than other metadata parameters.

The method 300 may begin at operation 301, wherein a test data record set population is generated. In some embodiments, operation 301 may be the same or substantially similar to operation 215 of FIG. 2. Per operation 302, a test script configured to test a designated system functionality is run on the test data record set population. Per operation 303, a determination is made as to whether more test runs are desired. If more test runs are desired, then, per operation 304, proportions within at least one group of proportions for a particular metadata parameter are selectively varied. Then operation 301 is repeated and a new test data record set population is generated according to the new proportions. For example, in one scenario a first test data record set population may be generated such that it has fifty percent of the values for a first metadata parameter being within a first value range and the remaining fifty percent of the values for the first metadata parameter being within a second value range. In this scenario, the proportions for the first metadata parameter may be varied when generating a second test data record set population, such that the second data record set population has twenty-five percent of the values for the first metadata parameter being within the first value range (rather than fifty percent) and the remaining seventy-five percent of the values for the first metadata parameter being with the second value range. Furthermore, in this scenario, the groups of proportions for other metadata parameters under analysis may remain unchanged between the first and second test data record set populations.

Once a determination is made in operation 303 that no more test runs are desired, then, per operation 305, the results of the test runs 304 are compared. Based on the comparison and per operation 306, a determination may be made as to the relative significance of the metadata parameters (or specific values of the metadata parameters) on the system functionality under test. This may involve, for example, determining that the values of a first metadata parameter have a more significant impact on how well the system functionality performs than the values of a second metadata parameter.

In some embodiments, rather than varying metadata parameters in isolation (e.g., independently of each other), dependencies or correlations between two or more metadata parameters may be maintained in numerous test data record set populations. For example, an analysis of metadata for a target data record set population might reveal that ninety-nine percent of actual data record sets that have a particular first value for a first metadata parameter also have a particular second value for a second metadata parameter. By maintaining this strong correlation when generating individual test data record sets, the test data record set populations on the whole may be more realistically representative of the target data record set population that they are designed to emulate.

Furthermore, known strong correlations between metadata parameters may also be useful for indirectly inferring characteristics about a target data record set population. For example, if high values for a first metadata parameter are associated with low values for a particular characteristic, then, by analyzing values of the first metadata parameter within a target data record set population, the user may be able to infer values for the particular characteristic. More generally, by leveraging known relationships, a user may able to learn much more about a target data record set population than about the values of metadata parameters that are actually obtained and analyzed.

Figure 4:
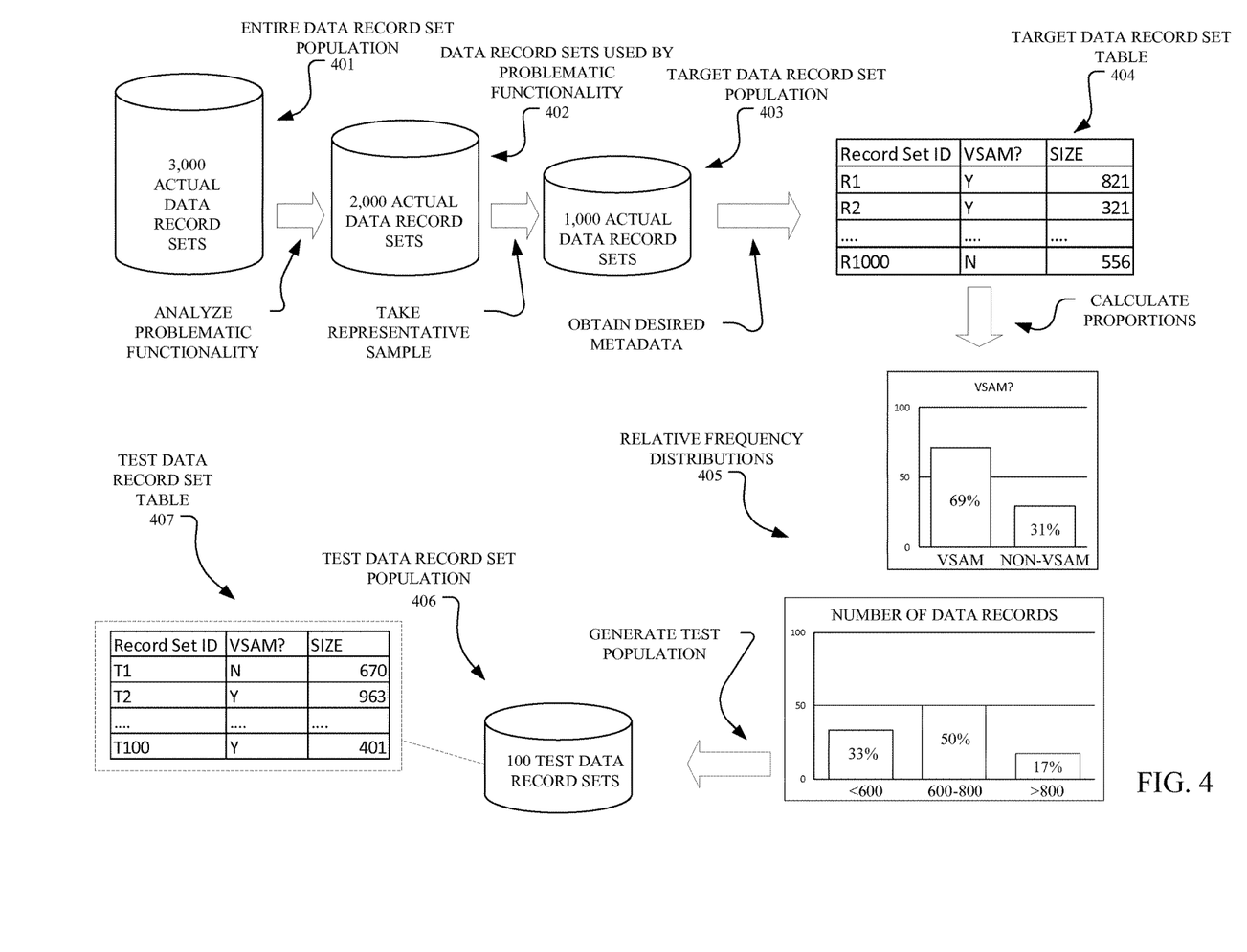
FIG. 4 illustrates a block diagram depicting an example use of operations of the method of FIG. 2 to generate a test data record set population using an actual data record set population, in accordance with embodiments of the present disclosure.

Referring now to FIG. 4, shown is a block diagram depicting an example use of operations of the method 200 of FIG. 2 to generate a test data record set population 406 using an actual data record set population 401, in accordance with embodiments of the present disclosure. As shown, the entire actual data record set population 401 includes three-thousand actual data record sets (which could collectively include millions of actual data records). In order to narrow this entire data record set population 401 to a more relevant group of data record sets, a problematic system functionality is selected for testing and is analyzed. In this example, based on the analysis, it is determined that the group of data record sets used by the problematic functionality 402 is two-thousand actual data record sets (i.e., only two-thirds of the entire population 401). A representative sample of the group of data record sets 402 is selected. This sample, which includes, in this example, only one-thousand actual data record sets, forms the target data record set population 403.

Continuing the example, desired metadata is obtained about the target data record set population 403. As shown, the metadata is organized into a table 404 of information about the target data record sets. Specifically, in this example, the information in the table 404 includes (for each actual data record set of the target data record set population 403) a record set identifier, a value for a first metadata parameter (in this instance VSAM status), and a value for a second metadata parameter (in this instance, size of the data record set in terms of its number of data records). Using the table 404, a group of proportions of values within selected value ranges are calculated for each of the first metadata parameter and the second metadata parameter.

The results are then represented as relative frequency distributions 405. In this particular example, a first relative frequency distribution 405 is in the form of a first histogram relating to the VSAM-status metadata parameter. As shown, the first histogram shows that sixty-nine percent (six-hundred ninety) of the data record sets of the target data record set population 403 are VSAM data record sets, while thirty-one percent (three-hundred ten) of the data record sets are non-VSAM data record sets. A second relative frequency distribution 405 is in the form of a second histogram relating to the size metadata parameter. As shown, the second histogram shows that thirty-three percent of the data record sets of the target data record set population 403 include less than six-hundred data records, fifty percent of the data record sets include between six-hundred and eight-hundred data records, and seventeen percent of the data record sets include over eight-hundred data records.

To continue the example, the relative frequency distributions 405 are then used to generate a test data record set population 406. In this instance the test data record set population 406 includes one-hundred test (e.g., non-actual) data record sets. The test data record set population 406 may be represented in a test data record set table 407. As shown, the table 407 includes (for each test data record set) a record set identifier, a value for the first metadata parameter, and a value for the second metadata parameter. In some situations, the test data record set population 406 may, depending on the particular predetermined criteria that it is created to meet, have a variety of different characteristics. For example, if the test data record set population 406 is designed to closely emulate the target data record set population 403, then it may have roughly the same groups of proportions for the first and second metadata parameters as the target data record set population 403. More specifically, in this particular instance, the test data record set population 406 may (given that it is composed of one-hundred data record sets) have approximately sixty-nine VSAM data record sets, thirty-one non-VSAM data record sets, thirty-three data record sets of less than six-hundred data records, fifty data record sets having between six-hundred and eight-hundred data records, and seventeen data record sets of over eight-hundred data records.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for using target metadata of a target data record set population to generate a test data record set population, the method comprising:

identifying, without accessing content of individual record sets, a group of data record sets stored on a target data storage system by scanning a system catalog of the target data storage system;

selecting, as the target data record set population, a subgroup of data records sets from the group of data records;

analyzing the target metadata, the target metadata containing, for each individual target data record set of the target data record set population, a value for a block size metadata parameter and a value for a VSAM metadata parameter, wherein the target data record set population as a whole has a first set of values for the block size metadata parameter distributed among a first plurality of value ranges and a second set of values for the VSAM metadata parameter distributed among a second plurality of value ranges;

calculating, based on the analyzing the target metadata and without accessing content of individual target data record sets of the target data record set population, first and second groups of proportions for the target data record set population, wherein the first group of proportions has, for each value range of the first plurality of value ranges, a proportion of the first set of values within that particular value range and the second group of proportions has, for each value range of the second plurality of value ranges, a proportion of the second set of values within that particular value range; and generating, based on at least the first and second groups of proportions calculated without accessing the content of the target data record sets, the test data record set population, wherein the test data record set population meets a set of predetermined criteria, wherein each individual test data record set of the test data record set population has a value for a block size metadata parameter and a value for a VSAM metadata parameter, and wherein the test data record set population as a whole has a third set of values for the block size metadata parameter distributed among the first plurality of value ranges and a fourth set of values for the VSAM metadata parameter distributed among the second plurality of value ranges.

2. The method of claim 1 further comprising:

running a test script on the test data record set population;

calculating a revised first group of proportions by selectively varying at least two proportions of the first group of proportions;

generating, based on the revised first group of proportions and the second group of proportions, a second test data record set population;

running the test script on the second test data record set population;

comparing results of the running the test script on the test data record set population and results of the running the test script on the second test data record set population; and determining, based on the comparing, a significance of the first metadata parameter relative to the second metadata parameter.

3. The method of claim 1 further comprising:

identifying data record sets stored on a target data storage system;

determining that a subgroup of the identified data record sets are used in the target data storage system by a system functionality under test;

selecting, in response to the determining, a representative sample of the subgroup of data record sets as the target data record set population;

determining that a first consumer data storage system of a plurality of consumer data storage systems performs the defragmentation functionality more than other consumer data storage systems of the plurality;

selecting, based on the determining, the first consumer data storage system as the target data storage system.

* * * * *